Oct. 26, 1948.　　F. C. VICTORY ET AL　　2,452,509
WHEEL TRUING DEVICE

Filed Sept. 27, 1944　　　　　　　　　　　　4 Sheets-Sheet 1

INVENTORS
*Frederick Clark Victory*
*John Robert Moore*
BY
*John H. Hanrahan*
ATTORNEY Oct. 26, 1948.  F. C. VICTORY ET AL  2,452,509
WHEEL TRUING DEVICE
Filed Sept. 27, 1944  4 Sheets-Sheet 2

INVENTORS
*Frederick Clark Victory*
*John Robert Moore*
BY
*John F. Hanrahan*
ATTORNEY Oct. 26, 1948.   F. C. VICTORY ET AL   2,452,509
WHEEL TRUING DEVICE
Filed Sept. 27, 1944                    4 Sheets-Sheet 3

INVENTORS
Frederick Clark Victory
John Robert Moore
BY John H Hanrahan
ATTORNEY

Oct. 26, 1948. F. C. VICTORY ET AL 2,452,509
WHEEL TRUING DEVICE
Filed Sept. 27, 1944 4 Sheets-Sheet 4
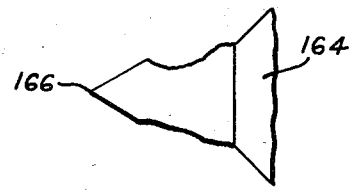
Fig. 9
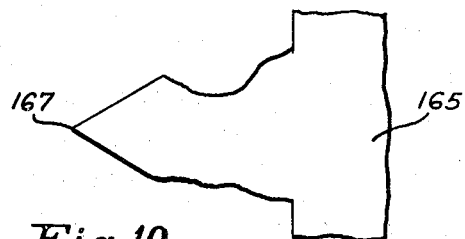
Fig. 10
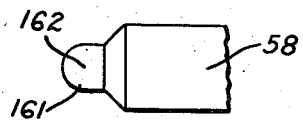
Fig. 11
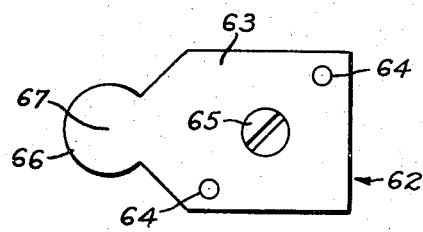
Fig. 12
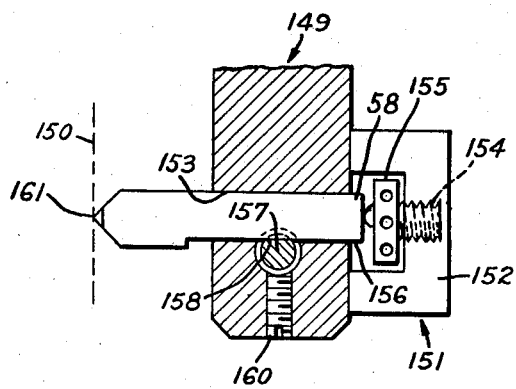
Fig. 13
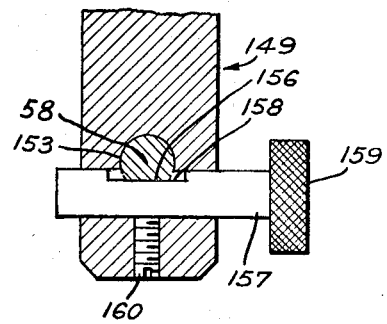
Fig. 14
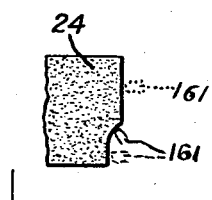
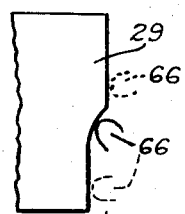
Fig. 15.
INVENTORS
Frederick Clark Victory
John Robert Moore
BY
John A. Hanrahan
ATTORNEY Patented Oct. 26, 1948

2,452,509

UNITED STATES PATENT OFFICE 2,452,509

WHEEL TRUING DEVICE

Frederick C. Victory, West Haven, and John Robert Moore, Bridgeport, Conn., assignors to Moore Special Tool Co. Inc., a corporation of Connecticut Application September 27, 1944, Serial No. 555,952

20 Claims. (Cl. 125—11)

This invention relates to new and useful improvements in wheel dressers and has particular relation to a means for dressing form grinding wheels.

An object of the invention is to provide in a grinding machine a wheel dressing means, including a wheel dressing diamond or other tool, a stylus and a template to be traced by the stylus, a pantograph means connecting the stylus and tool whereby rectilinear movements of the stylus against the working face of the template will be duplicated by the tool but on a different scale, and means whereby the weight of the pantograph means and any pressure applied thereto is prevented from forcing the tool in the direction of the grinding wheel.

Another object is to provide in a grinding machine including a movable wheel head a mechanism as indicated above and wherein such mechanism is mounted on said wheel head for movement therewith.

A further object is to provide in a grinding machine a wheel dressing means including a wheel dressing tool, a stylus and a template to be traced by said stylus, a pantograph means connecting the stylus and tool whereby rectilinear movements of the stylus along the working face of the template are duplicated by the tool but on a different scale, the stylus and tool both mounted for pivotal movements on vertical axes, and means connecting the tool and stylus whereby movement of one about its vertical axis is duplicated by the exact same movement of the other and angular orientation of the stylus normal to the working face of the template positions the tool normal to the wheel face being dressed.

Another object is to provide in a grinding machine a wheel dressing means including a wheel dressing tool, a stylus and a template to be traced by the stylus, a pantograph means connecting the stylus and tool whereby rectilinear movements of the stylus against the working face of the template are duplicated by the tool but on a different scale, an adjustable slide, a main pivot mounting said pantograph means on said slide, and means for feeding said slide and thus said pantograph means to move said tool toward the wheel and thus govern the amount of stock-removal from the wheel.

Yet another object is to provide in a grinding machine including a wheel dressing tool, a stylus and a template to be traced by said stylus, a pantograph means mounting said stylus and tool whereby rectilinear movements of the former against the working face of the template are duplicated by the tool but on a reduced scale, a slide movable in directions laterally of the wheel of the grinding machine, and means mounting the main pivot of said pantograph means on said slide whereby said pantograph means and tool may be positioned for the forming and dressing of contours on the side of said wheel.

A further object is to provide in a grinding machine, a pantograph means, a wheel dressing tool, a stylus, a pair of rotative shafts mounted by said pantograph means in such relation that rectilinear movement of one is imparted to the other but on a reduced scale, means mounting the tool on one of said shafts and the stylus on the other thereof, and means for accurately locating said tool and stylus relative to the center lines of their respective rotative shafts whereby to permit of the use of interchangeable tools and styli of circular or non-circular form.

Other objects and advantages will become apparent from a consideration of the following detailed description tken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 9 is an enlarged plan view showing a tool or diamond, of irregular or non-circular form, that may be used;

Fig. 10 is a plan view of a stylus of the profile of the tool of Fig. 9;

Fig. 11 is a view corresponding with Fig. 9 but showing a radiused or circular form of tool or diamond and a portion of its holder;

Fig. 12 is a bottom plan view of the stylus of Figs. 1–8 and showing the mounting of such stylus, the same being circular and adapted for use when the tool of Fig. 11 is used;

Fig. 13 is an enlarged detail sectional view showing the mounting of the diamond or tool holder;

Fig. 14 is a view similar to Fig. 13 but taken at right angles thereto; and

Fig. 15 is a view showing a portion of a wheel, a template and several positions of the stylus and tool normal to different working faces of the template and wheel, respectively.

Figure 1:
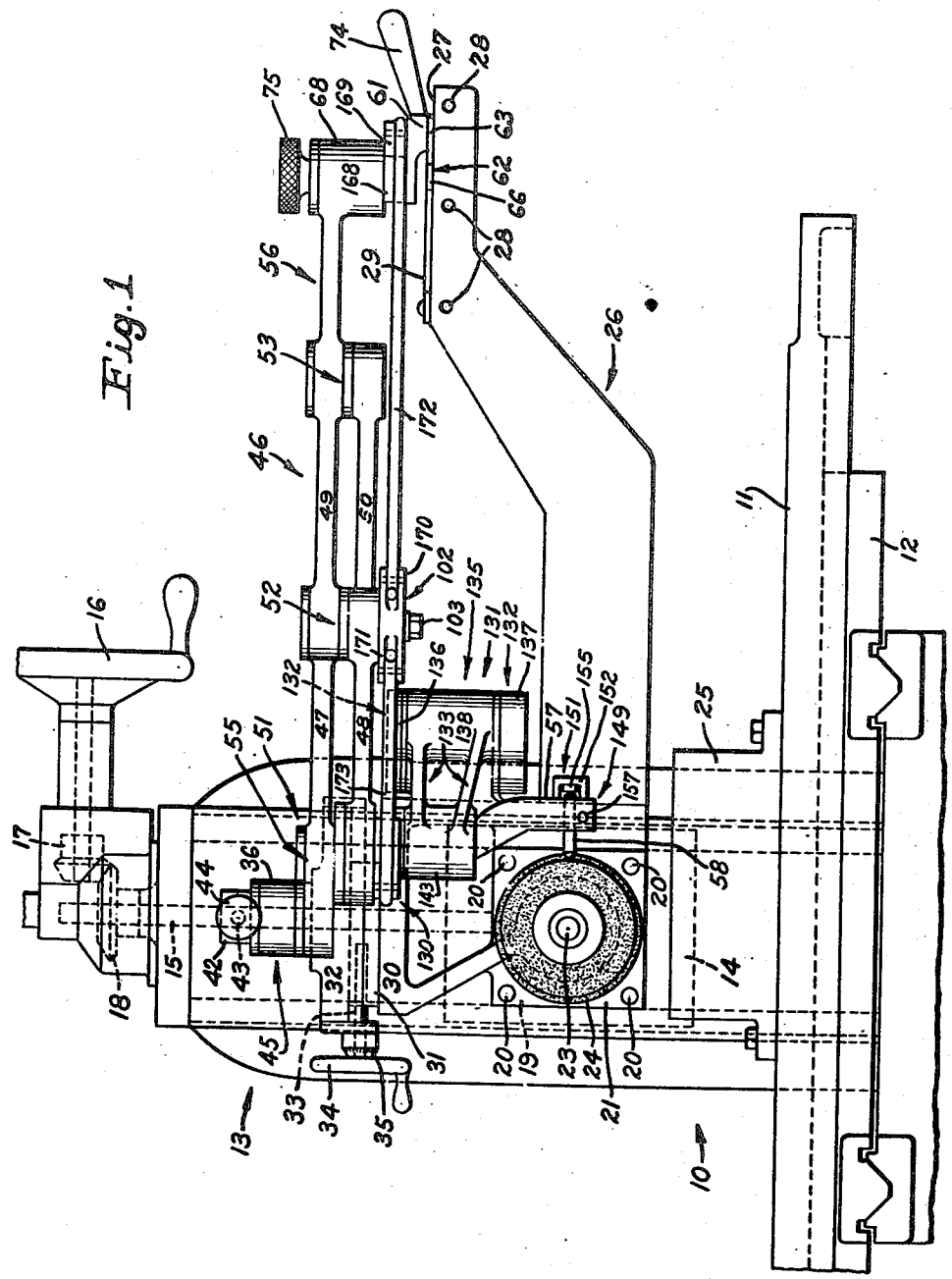
Fig. 1 is a front elevational view showing the upper portion of the grinding machine having the invention incorporated therein.
Figure 2:
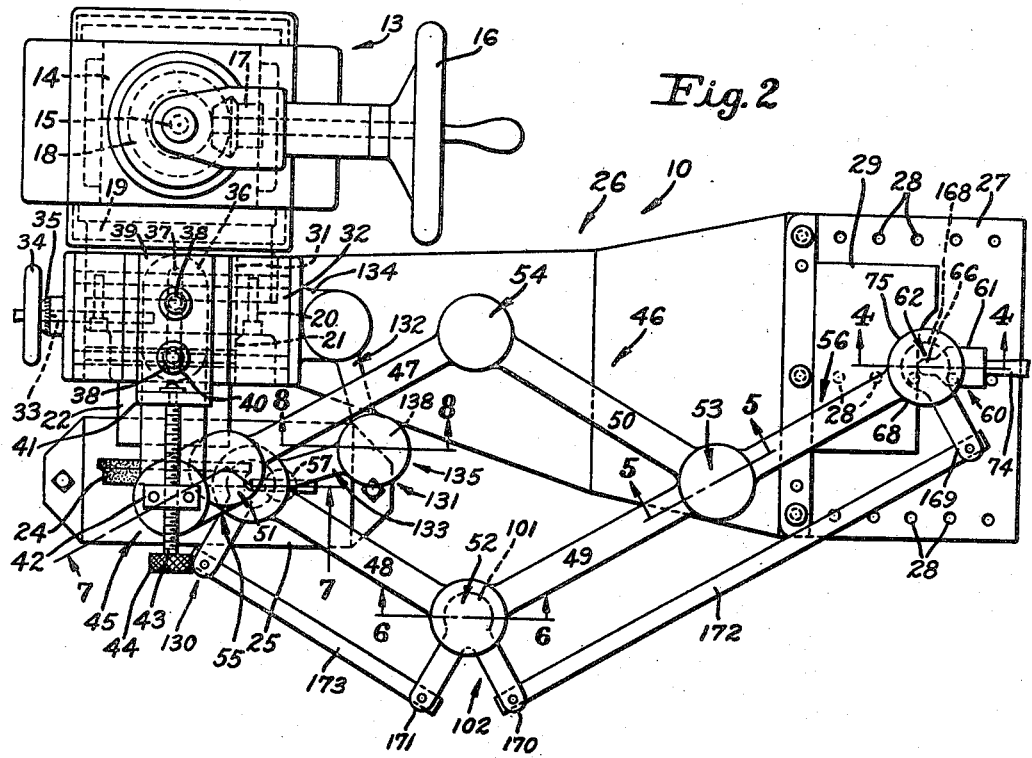
Fig. 2 is a top plan view of the machine of Fig. 1.
Figure 3:
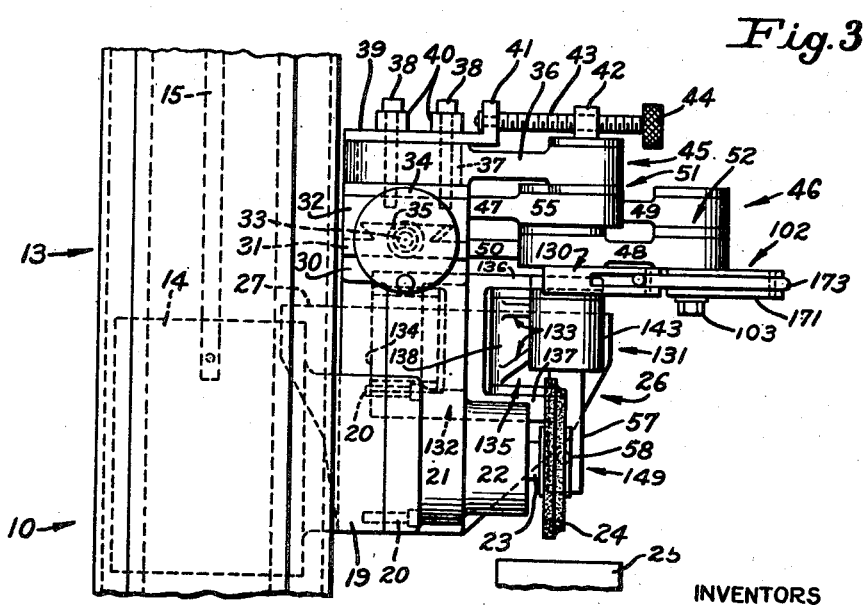
Fig. 3 is a side elevational view of the mid-portion of the machine, the view being taken as looking from the left in Fig. 1.

Referring in detail to the drawings a grinding machine generally designated 10 includes a longitudinally movable table 11 mounted on a saddle 12 movable in directions transverse to those in which the table is movable. At the rear of the table 11 is a vertical tool post 13 including a vertically adjustable means or slide 14. This slide is adapted to be raised and lowered by means of a vertical screw 15 fixed to the slide. A hand wheel 16 is adapted to rotate bevelled gears 17 and 18. Gear 18 is threaded to the shaft or screw 15 whereby the latter will be raised or lowered depending on the direction in which said gear may be turned, and will cause a corresponding movement of the slide 14.

Movable with slide 14 is a bed or block 19 to which bolts 20 secure a bracket 21 the latter including a portion 22 mounting a shaft 23 to which is fixed a grinding wheel 24. It is noted that wheel 24 is located over a magnetic chuck 25 removably fixed to the table 11 for movement therewith relative to the said wheel 24. Thus the chuck is adapted for the supporting of work to be ground and the moving of such work back and forth under the wheel. Clearly the wheel head described is adapted for vertical movement with the block 19 and relative to the chuck and table.

Mounted on the bracket 21 for movement therewith and with the wheel head is a bracket or extension 26, preferably of channel or other rigid construction, projecting to one side of the bracket 21 and on its upper side at its outer end including a table-like portion 27. Portion 27 is provided with a series of bolt receiving holes or openings 28 adapted for use in fixing clamps or other means in place when such clamps or other means are used for the locating and securing in place of a template, as a template 29 shown in the various figures of the drawings.

Bracket 21 includes an upper shelf-like portion 30 having integral therewith or secured thereto a block or portion 31 provided with dove-tail ways mounting a slide 32. A screw 33 having a hand wheel 34 or other turning means fixed thereto is adapted to feed the slide 32 on the block or portion 31 in directions transversely of the axis of the shaft 23. Preferably a micrometer scale 35 is associated with the screw 33 whereby the amount of feed of the slide 32 is accurately shown so that the operator will know, as he makes an adjustment of the slide, the exact extent of such adjustment.

On the upper side of slide 32 is a second slide 36 adjustable in directions at right angles to the directions in which the slide 32 is adjustable or in directions parallel with the shaft 23. The body of the slide 36 is provided with a vertical slot 37 (although if desired two slots each of a reduced length may be used) through which pass bolts 38 threaded or otherwise fixed to the slide 32. Clearly within the limits of the slot 37 the slide 36 is adapted to be adjusted at right angles to the directions in which the slide 32 may be adjusted. An L-shaped bracket 39 is located on the upper side of the slide 36 and has openings through which the bolts 38 pass without play. Collars 40 on the bolts 38 at the upper side of bracket 39 are adapted to be clamped against the bracket and thus clamp the latter against the slide 36 and such slide against the slide 32 on tightening of the bolts.

A smaller bracket 42 on the upper side of the outer end portion of slide 36 has a screw 43 threaded therethrough and journaled in the vertical arm 41 of the bracket 39. A knurled head 44 on the outer end of the screw 43 provides for the manual turning of such screw. With the described construction when the bolts 38 are loosened the slide 36 may be adjusted transversely of the slide 32 by turning of the screw 43. The screw cannot be fed relative to the bracket 39 and therefore as the screw is rotated when the bolts 38 have been loosened the slide 36 is caused to move with the smaller bracket 42 as the latter is fed along by the screw. After any desired adjustment has been made the bolts 38 are again tightened and the parts are locked in their new positions.

A main pivot 45 suspends a pantograph means generally designated 46 from the outer end portion of the slide 36. The arms of pantograph means 46 are designated 47, 48, 49 and 50 and it is pantograph arm 47 which is pivoted at 45 to the slide 36. Arm 48 is pivoted to arm 47 in spaced relation to the pivot 45 as at 51 while an intermediate pivot 52 connects arms 48 and 49. In addition arms 49 and 50 are pivoted together at 53 and an intermediate pivot 54 connects the arms 47 and 50. It is here noted that the intermediate pivots 52 and 54 are of the same construction and that the pivot 53 is located intermediate the ends of the arm 49. The portion of arm 47 between the pivots 45 and 51 is designated 55 and the portion of arm 49 beyond pivot 53 is designated 56. The relation of the length of portion 55 to that of portion 56 determined the ratio of movement of a tool to that of movement of a stylus.

In spaced relation to the pivot 51 a shaft 57 is rotatively suspended from the arm 48. Toward its lower end said shaft 57 mounts a tool holder 58 and the relation of the parts is such that under the best conditions the shaft supports the tool holder at a level to have such holder present the cutting edge of a tool (as a diamond) in the exact center line of the grinding wheel 24. Under some conditions, as when using an octohedron shape of diamond, the cutting edge may initially be below the center line of the wheel and then as the radius of the diamond is renewed its cutting edge is higher and finally is slightly above the center line of the wheel. In the present instance the tool is disclosed as a diamond although it is understood that any tool suitable for the purpose may be used.

From the free or outer end portion of the arm portion 56 (see Figs. 1 and 4) a shaft 59 is rotatively suspended. At its lower end said shaft carries a head-like portion 60 including a portion 61 extending radially with respect to the center line of said shaft and having secured to its lower end (in a manner to be set forth) a stylus 62 adapted to be turned with shaft 59 as an axis and to be fed across the working face of the template 29 all as will be described and for the purpose to be set forth. Since the tool holder and stylus are both mounted by the pantograph means 46 rectilinear movement of the stylus will be duplicated by the tool holder and owing to the relationship of the arm portions 55 and 56 the movement of the tool holder will be on a reduced scale as compared with that of the stylus.

Figure 4:
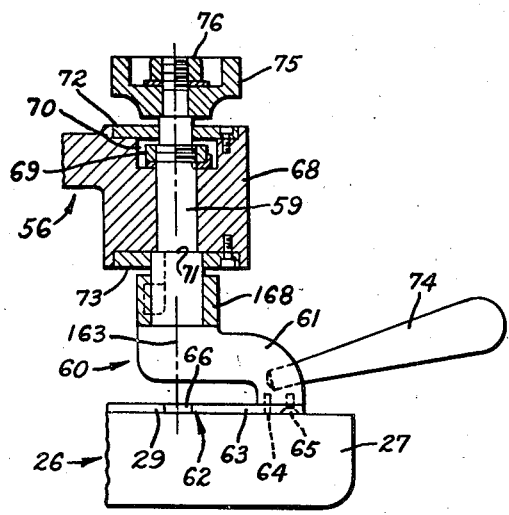
Fig. 4 is an enlarged vertical sectional view taken as along the plane of the line 4—4 of Fig. 2.

Stylus 62 as here shown comprises a metal plate including a body 63 secured against the lower end of the head 60 as by locating dowel pins 64 and a securing screw 65 (see Figs. 4 and 12). The forward end of body 63 carries a rounded or circular portion 66, comprising the active portion of the stylus proper and the center of the radius of this circular portion is indicated at 67. The free end portion of arm portion 56 is enlarged providing a head-like portion 68 (see Figs. 1 and 4) in which the vertical stylus carrying shaft 59 has bearing.

A nut 69 on said shaft and located in a recess 70 opening through the upper side of enlargement 68 holds the shaft in the arm against downward movement relative thereto and a shoulder 71 on the shaft at the lower side of head 68 prevents upward movement of the shaft in the head. Dust guards 72 and 73 on the upper and lower sides of the head 68 surround the shaft and are particularly desired when the shaft is mounted in anti-friction bearings (not here shown). A handle 74 is rigid with the head-like portion 60 for manipulation thereof and a knurled hand piece 75 is clamped on the upper end portion of the shaft 59 as by a nut 76.

Figure 5:
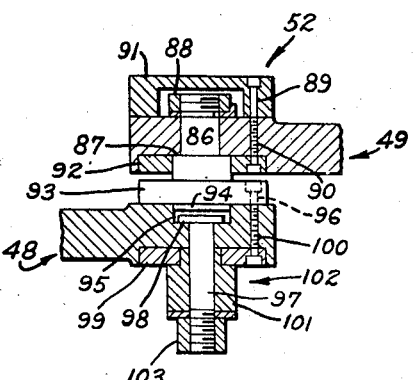
Fig. 5 is a similar view taken as along the plane of the line 5—5 of Fig. 2.

The pivotal connection 53 between arms 49 and 50 is shown in section in Fig. 5. There it will be seen that a stud 77 passing through the arm 49 includes a shoulder 78 bearing against the underside of such arm and an upper threaded end portion receiving a nut 79 at the upper side of the arm. In this way the stud is mounted for turning movement in the arm 49 but is held against all other movement relative thereto. A dust cap 80 encloses the nut and with a dust guard 81 at the lower side of the arm serves to exclude dirt and dust from the bearing of the stud in the arm and which bearing may be and preferably is anti-friction. Screws 82 are shown as securing the dust cap and dust guard in place.

Below the shoulder 78 the stud 77 includes a head 83 having on its underside a pilot-like extension 84 entering a recess in the upper side of the end portion of arm 50. Small screws 85 serve to secure the head 83 to the arm 50 although these parts may be secured together in any other manner desired. With the described construction it will be seen that while the arms 49 and 50 may pivot relatively they are held against all other relative movement.

Figure 6:
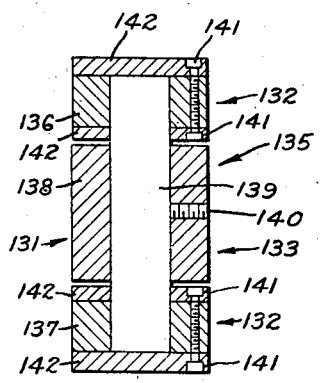
Fig. 6 is a similar view taken as along the plane of the line 6—6 of Fig. 2.

Fig. 6 shows the construction, in section, of the intermediate pivot joint 52 although the construction is the same for the joint or pivot 54. In this intermediate pivot a stud 86 includes a shoulder 87 bearing against the underside of the arm 49 and held thereagainst by a nut 88 threaded on the upper end of the shank of said stud. The stud is rotatable in the end portion of arm 49. Small screws 89 and 90 serve to secure a dust cap 91 over the nut 88 and the upper end of the stud shank and a dust guard or ring 92 in a pocket about the enlarged stud portion resulting in the formation of the shoulder 87. The stud includes a head 93 provided with a centering pilot 94 entering a socket 95 in the upper side of the end portion of arm 48. Small screws 96 or other means are used to secure the stud head 93 to the said end portion of arm 48.

The construction at pivot 52 as thus far described is substantially the same as that at the pivot 53 as seen in Fig. 5. However, at pivot 52 a stud 97 passes downwardly through the end portion of arm 48 and the head 98 of said stud is disposed in the socket 95 while the shank of said stud projects a considerable distance below the underside of arm 48. A dust guard 99 may be secured in place about the stud as by small screws 100. On the shank of stud 97 is the hub or pivot portion 101 of a bell-crank 102 the purpose of which is to be set forth. This bell-crank may be turned with or about the stud shank and is kept in place thereon as by a nut 103 or the like.

Figure 7:
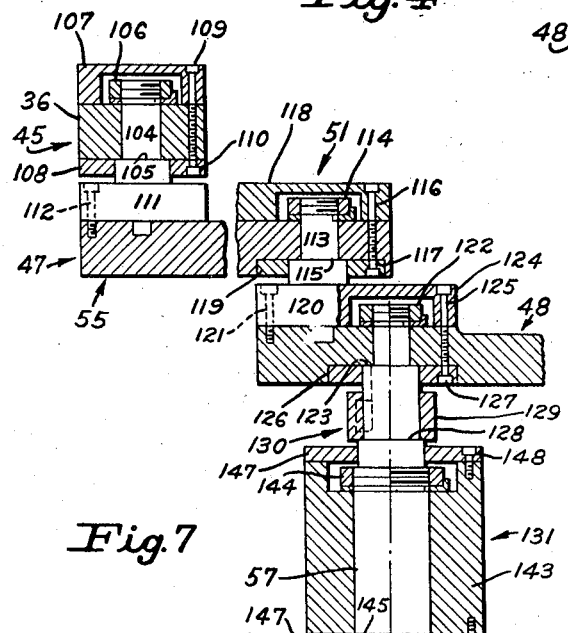
Fig. 7 is a similar view taken as along the plane of the line 7—7 of Fig. 2.

Fig. 7 shows in section the construction of the pivot 45, the pivot 51 and the pivotal mounting of the vertical shaft 57. Pivot 45 comprises a stud 104 the shank of which passes through the outer end portion of the slide 36 and includes a shoulder 105 engaging the lower surface of such slide portion. The shank of stud 104 passes entirely through the slide and on the upper end portion of such shank a nut 106 is threaded serving to draw the shoulder 105 against the slide and to retain the stud mounted on the slide for pivotal or turning movement relative thereto.

A dust cap 107 and a dust guard ring 108 are held in place by screws 109 and 110, respectively. At its lower end stud 104 includes a head 111 having a pilot-like extension entering a recess in the upper side of the end portion of the arm 47 and the head 111 is secured to said arm by screws 112 although other means may be used for connecting the stud head to the arm. The stud is mounted in the slide by anti-friction means (not shown) and it will be clear that with the described construction the stud is mounted to turn in the slide and thus pivotally connects the arm 47 (and thus the entire pantograph means 46) with the slide.

The pivotal connection 51 between the arms 47 and 48 includes a stud 113 the shank of which passes entirely through arm 47 and at the upper side thereof is engaged by a nut 114 which when threaded down onto the shank draws a shoulder 115 of the same against the under side of said arm. Screws 116 and 117 secure a dust cap 118 and a dust guard 119 to the upper and lower sides of the concerned end portion of the arm 47.

Stud 113 includes a head 120 secured to the upper side of the adjacent end portion of arm 48 by means of screws 121 or otherwise as may be desired. With this construction it will be clear stud 113 is turnable in the arm 47 and serves to secure the arms 47 and 48 together for pivotal movement but against any other relative movement. Preferably the shank of the stud 113 is mounted in anti-friction bearings (not shown).

Shaft 57 has its upper end portion reduced and passing through the arm 48 and at the uper side of the latter equipped with a nut 122. This nut serves to draw a shoulder 123 of the shaft against the under side of the arm 48 and the nut may be covered with a dust cap 124 secured in place as by screws 125 while at the lower side of arm 48 a dust guard 126 is secured in place about the shaft by screws 127. With this construction the shaft is suspended from the arm 48 to have movement with said arm and also for turning movement about its own axis relative to said arm. The dust cap 124 and the dust guard 126 function as do the previously described dust caps and guards to exclude dust and dirt from the enclosed bearings.

Below the arm 48 and against the upper side of a shoulder 128 on the shaft 57 a collar or eye portion 129 of a lever 130 is fixed to the shaft 57. The construction is such that on horizontal movement of the lever 130, which extends radially with respect to the shaft, the shaft is given a turning movement with respect to the pantograph arm 48. While the shaft 57 is suspended from the arm 48 and is susceptible of rectilinear movement therewith and turning movement relative thereto the shaft is actually supported independent of said arm whereby the weight of the pantograph and any force applied thereto will not and cannot cause movement of the shaft such as to force the tool holder 58 toward the wheel 24.

Figure 8:
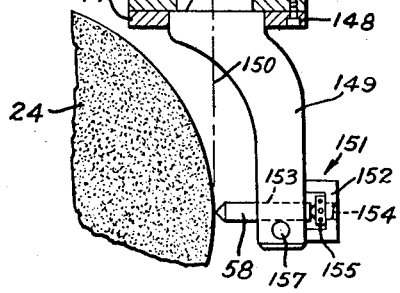
Fig. 8 is a similar view taken as along the plane of the line 8—8 of Fig. 2.

The supporting means here disclosed for the described purpose comprises an articulated bracket generally designated 131. The said bracket includes arms 132 and 133 of which the arm 132 is mounted to swing horizontally on a pivotal mounting including ear portions 134 secured to or cast with the bracket 21 above described. Arms 132 and 133 are pivoted together as at 135, the details of construction of such pivot 135 being shown in Fig. 8.

At the pivot 135 the arm 132 is bifurcated and includes portions 136 and 137 between which is located the end portion 138 of the bracket arm 133. Arm portion 138 is shown locked to a pivot pin 139 as by a set screw 140 and small screws 141 are shown as securing dust guards 142 in place. The shaft 57 passes downwardly through the other end portion 143 of the bracket arm 133 and a nut 144 (see Fig. 7) threaded to a portion of said shaft serves to secure the bracket arm in place by drawing a shoulder 145 of the shaft up against the under side of the said bracket arm. Dust plates 147 are shown as secured in place by small screws 148.

With the described construction it will be understood that the entire bracket 131 may be swung horizontally about the pivotal mounting 134 and that the bracket arms 132 and 133 may have relative pivotal movement at the joint 135 about the pin 139, that the shaft 57 may be turned or rotated in the bracket arm portion 143 but that with all this the bracket will support the said shaft against tilting movement such as might occur if only the pivot 45 was depended upon to support the entire pantograph structure. The weight of the pantograph and any force applied thereto, as any downward force that might be applied to the handle 74 or the hand piece 75 by the operator, will not cause tilting of the shaft 57 to carry the tool holder 58 toward the grinding wheel 24.

The lower portion, designated 149, of the shaft 57 is radially off-set with respect to the center line of the said shaft. This is probably best shown in Fig. 7 wherein the center line of the shaft is indicated at 150. Carried on the outer side of shaft portion 149 is a bracket or support 151 including upper and lower arms secured at their inner ends to the shaft portion 149 and an outer portion 152 parallel with such shaft portion. The bracket is aligned with an opening 153 through the said shaft portion (see Figs. 13 and 14) and adapted to receive the tool holder 58.

Mounted by the bracket portion 152 is a screw 154 having a head 155 adapted to be used for turning the screw to thread the same toward and from the shaft portion 149. This screw is aligned with the tool holder receiving opening 153 and at its inner end is cone shaped and engages against the outer end of the tool holder. Screw head 155 is provided with spaced openings adapting the same and thus the screw for turning by a small spanner wrench or the like.

On one side tool holder 58 is provided with a flat 156 and an aligning and locking pin 157 passing transversely through shaft portion 149 is also provided with a flat side 158 against that of the tool holder when the latter is in place ready for use. The aligning and locking pin 157 is provided with a knurled head 159 for manual turning and movement in and out of the shaft. A set screw 160 entering the shaft portion 149 through the lower end thereof is threaded against the intermediate portion of the pin 157 and forcing it slightly upwardly against the flat side of holder 58 presses the latter tight against the upper side of the opening 153. Holder 58 mounts a diamond 161 and when the diamond is to be changed the screw 160 is eased off and the entire holder together with the diamond, is released. The flats 156 and 158 insure that the holder 58 is properly positioned to have the diamond 161 held in the proper position for engagement with the work, i. e., with the axis of its radius vertically disposed.

When a diamond having a radius is being mounted on the shaft 57 the radius of the diamond is known and in positioning the holder measurements are made from the rear or outer side of the bracket portion 152. The flats on the holder and pin insure the proper positioning of the holder and its diamond as to the plane the latter should occupy. In addition the distance from the outer side of bracket portion 152 to the center line or axis of the shaft 57 is known, such axis being indicated by the line 150 of the drawings.

When the holder 58 is inserted in the opening the holder is not tightened in place until it is so located that the center 162 of the radius of diamond 161 (see Fig. 11) is in the center or axial line of shaft 57. As the distance from the outer side of 152 to such center line is known and the radius of the diamond is also known a micrometer or other means is used to determine the location of the cutting edge of the diamond. Such location represents a distance equal to the distance from the outer side of 152 to the center line 150 plus the radius of the diamond. Now the holder is properly located and is secured in place on tightening of the screw 160.

Stylus portion 66 is in proportion of the same radius as the diamond, the proportionate relationship between these parts being determined in advance by the relation between pantograph arm portions 55 and 56. The stylus is mounted on the portion 61 of head 60 in such relation that the center 167 of the radius of the stylus part 66 is in the axial center line of the shaft 59. It will be understood that the stylus is made exactly to order and that the dowel or locating pins 64 are positioned so that when the stylus is mounted on the head 60 the center 67 of the radiused portion 66 of the stylus is in the center or axial line of shaft 59, such center or axial line being indicated at 163.

When an irregularly shaped or non-circular diamond is used, such as that shown at 164 in Fig. 9, a correspondingly shaped stylus is used. Such a stylus is shown at 165 in Fig. 10. When such a diamond is used its holder is so positioned that the highest point of the diamond, as point 166 of the diamond 164, is mounted or located in the center line 150 of shaft 57 and the stylus 165 is then so mounted that its high point 1467 is located in the center line of shaft 59. In this connection it will be understood that the stylus is so made that when it is located by the pins 64 its point 167 is in such center line 163.

From the foregoing description it will be understood that we have provided means whereby interchangeable tools (diamonds) and styli of circular or non-circular form may be accurately located with respect to the center lines of the shafts 57 and 59. The styli are made to be so located immediately they are mounted over the pins 64 and by measurement as above outlined the diamond may be readily located. Where standardized diamonds are available and used, standardized styli will be used.

Fixed on the shaft 59 above the head portion 60 thereof is a collar or eye-like portion 168 of a lever 169 extending radially with respect to said shaft. The collar 168 is so fixed or attached to the shaft 59 that horizontal swinging movement of the lever 169 results in a turning movement of the shaft and turning movement of the shaft results in horizontal swinging movement of the said lever. Bell-crank 102 includes levers 170 and 171 and a link 172 is pivoted at its respective ends to the levers 169 and 170 while a similar link 173 is pivoted at its respective ends to the levers 130 and 171. With this constructoin it will be understood that turning of the shaft 59 about its axis results in the exact same movement of shaft 57 about its axis.

Thus by means of a linkage connecting the stylus supporting shaft 59 with the diamond (tool) supporting shaft 57 the angular orientation of the stylus normal to the working face of the template 29 governs that of the diamond relative to the face of the wheel being dressed. Fig. 15 by full lines, dotted lines and dash lines shows several corresponding positions of the stylus and diamond. The described construction permits of the repeated and uniform dressing of shapes impossible of repeated and uniform dressing by other means. Where the diamond is of irregular or non-circular shape, as the diamond 164, its point may at all times be kept directly to the wheel simply by the operator maintaining the point of the corresponding stylus normal to the working face of the template. With a radiused diamond any part of the cutting edge may be brought into or kept in use at any time.

The entire pantograph means, together with the parts mounted thereon, is mounted on the movable wheel head so that when the latter is adjusted the dressing mechanism remains in the same relation to the wheel as previous to any such adjustment. Movement of the slide 32 by the calibrated screw means described causes feeding of the entire pantograph means into or toward the wheel a measured amount or an amount readily determined from the reading of the micrometer scale 35. The feeding of the slide 32 as indicated moves the tool or diamond toward the work and governs stock-removal from the wheel.

The slide 36 being adjustable at right angles to the slide 32 permits off-setting of the entire pantograph means so that the same may be swung to position the diamond laterally of the wheel for forming and dressing contours on the side of the wheel as well as on the edge or face thereof, when such is necessary or desired.

Having thus set forth the nature of our invention, what we claim is:

1. In a grinding machine, a wheel dressing means including a dressing tool, a stylus and a template to be traced by said stylus, a pantograph means mounting and conncecting the stylus and tool whereby rectilinear movements of the stylus along the working face of said template are duplicated by the tool but on a reduced scale, and means supporting said tool independent of said pantograph means whereby the weight of said pantograph means and any pressure applied thereto is prevented from forcing the tool in the direction of the grinding wheel of the machine.

2. In a grinding machine, a work table, a vertical tool post in the rear of said table, a bracket vertically adjustable on said post and carrying a rotatable horizontally disposed shaft and a grinding wheel fixed on said shaft, a slide on the upper side of said bracket and adjustable thereon in directions transverse of said shaft, a slide on the first mentioned slide and movable therewith and adjustable relative thereto in directions longitudinally of said shaft, a horizontal pantograph means including a first arm pivoted at one end to the second mentioned slide, a second pantograph arm pivoted to the first arm in slightly spaced relation to the second slide, a vertical shaft pivotally connected with and depending from said second arm in spaced relation to the pivotal connection of the latter with the first arm and movable rectilinearly with the second arm, the other arms of said pantograph means pivoted to the first and second arms respectively and to one another, a vertical shaft depending from one of said other arms and rotatable relative thereto, a stylus carried by said second shaft and a wheel dressing tool carried by the first shaft whereby rectilinear movement of the stylus is duplicated on a reduced scale by said tool, linkage connecting said shafts whereby rotative movement of one is imparted to and duplicated in the other, an articulated bracket pivoted to the first named bracket, and said articulated bracket supporting the first mentioned vertical shaft whereby the weight of said pantograph means and any pressure applied thereto is prevented from tilting said first mentioned vertical shaft and thereby moving the tool in the direction of the grinding wheel.

3. In a grinding machine including a grinding wheel, a vertically adjustable slide mounting said wheel, a wheel dresser comprising a horizontal pantograph means including a first arm pivoted at one end on said slide, a second arm pivoted to the first arm in slightly spaced relation to the pivotal mounting of the latter, a vertical shaft connected with and depending from said second arm in spaced relation to the pivotal connection of the latter with the first arm, the other arms of said pantograph pivoted to the first and second arms respectively and to one another, a stylus carried by one of said other arms in such relation that rectilinear movement of the stylus is duplicated in said shaft but on a reduced scale, a wheel dressing tool carried by said shaft, an articulated bracket pivotally mounted at one end on said slide and at its other end pivotally connected with and supporting said shaft whereby the weight of said pantograph means and any pressure applied thereto is prevented from tilting said shaft and thereby moving the tool in the direction of the grinding wheel.

4. In a grinding machine including a horizontal work table, a wheel head, means mounting said wheel head for vertical movement toward and from said work table, means for moving said wheel head vertically, a wheel dressing means including a dressing tool, a stylus and a template to be traced by said stylus, a pantograph means mounting and connecting said stylus and tool whereby rectilinear movements of the former along the working face of said template are duplicated by the latter but on a reduced scale, and a main vertically disposed pivot mounting said pantograph means on said wheel head for movement of the pantograph means, tool and stylus therewith and for swinging movement in a horizontal plane relative thereto.

5. In a grinding machine, a wheel dressing means including a dressing tool, a stylus of the profile of said tool and a template to be traced by said stylus, a pantograph means mounting and connecting said stylus and tool whereby rectilinear movements of the stylus against the working face of said template are duplicated by the tool but on a reduced scale, independent means mounting the stylus and tool on the pantograph means for pivotal movements about vertical axes, said stylus and tool rigid with and extending radially from the respective independent means, and a separate linkage supported on said pantograph means and connecting the independent means to one another whereby movement of one about its axis is duplicated by the exact same movement of the other about its axis and angular orientation of the stylus normal to the working face of the template positions the tool normal to the wheel face being dressed.

6. In a grinding machine, a wheel dressing means including a dressing tool, a stylus of the profile of said tool and a template to be traced by said stylus, a pantograph means mounting and connecting the stylus and tool whereby rectilinear movements of the stylus against the working face of the template are duplicated by the tool but on a reduced scale, independent means mounting the stylus and tool on the pantograph means for pivotal movements about vertical axes, said stylus and tool rigid with and extending radially from the respective independent means, and means supported on said pantograph means for movement therewith and relative thereto and connecting the independent means to one another whereby movement of one about its axis is duplicated by the exact same movement of the other about its axis and angular orientation of the stylus normal to the working face of the template positions of the tool normal to the wheel face being dressed.

7. In a grinding machine, a wheel dressing means including a dressing tool, a stylus of the profile of said tool and a template to be traced by said stylus, a pair of parallel vertical shafts mounting respectively the stylus and the tool, a pantograph means mounting and connecting the stylus and tool shafts whereby rectilinear movements of the stylus against the working face of the template are duplicated by the tool but on a reduced scale, means mounting said stylus and tool shafts for rotative movements on their vertical axes, said stylus and tool rigid with and extending laterally from their respective shafts, a laterally extending arm rigid with each of said shafts, a bell-crank pivoted to an intermediate pivot of said pantograph means, a link pivoted to the arm of the stylus shaft and an arm of said bell-crank, and a link pivoted to the other arm of the bell-crank and the arm of said tool shaft whereby movement of the stylus shaft on its axis is communicated to and duplicated by the exact same movements of the tool shaft on its axis and angular orientation of the stylus normal to the working face of the template positions the tool normal to the wheel face being dressed.

8. In a grinding machine including a vertically movable wheel head carrying a grinding wheel, a wheel dressing means including a tool, a stylus and a template to be traced by said stylus, a pantograph means mounting and connecting said tool and stylus whereby rectilinear movements of the stylus along the working face of said template are duplicated by the tool but on a reduced scale, a slide on said movable wheel head and movable vertically therewith and adjustable horizontally relative thereto in directions laterally of said grinding wheel, and means mounting the main pivot of said pantograph means on said slide whereby said means and tool may be positioned for the forming and dressing of contours on the side of said wheel.

9. In a grinding machine, a pantograph means, a wheel dressing tool, a stylus and a template to be traced by said stylus, a pair of rotative shafts mounted by said pantograph means in such relation that rectilinear movements of one are imparted to the other but on a different scale, means mounting said tool on one of said shafts and said stylus on the other shaft, and means for accurately locating said tool and stylus relative to the axial center lines of their respective rotative shafts whereby to permit of the use of interchangeable tools and styli of circular and non-circular form.

10. In a grinding machine, a pantograph means, a wheel dressing tool, a stylus and a template to be traced by said stylus, a pair of rotative shafts mounted by said pantograph means in such relation that rectilinear movement of one is imparted to the other but on a reduced scale, means mounting said tool on one of said shafts and said stylus on the other thereof, means for accurately locating said tool and stylus relative to the center lines of their respective rotative shafts whereby to permit of the use of interchangeable tools and styli of circular and non-circular form, said means for mounting said tool including an off-set portion of said shaft and an opening transversely through such shaft portion, a tool holder at one end mounting said tool and passing through said opening, means for clamping said tool holder in place in said opening, and a screw means engaging said holder at the end thereof opposite that at which the tool is located and adjustable to shift the holder and tool when said clamping means is released.

11. A grinding machine attachment comprising a pantograph means, a pair of rotative shafts carried by spaced portions of said pantograph means for rotative movements and for corresponding rectilinear movements, said shafts adapted to mount a tool and a stylus respectively, and an articulated bracket adapted to be pivotally mounted on a grinding machine rotatively receiving one of said shafts and supporting the same independent of said pantograph means.

12. A grinding machine attachment comprising a pantograph means, a stylus carrier, a tool carrier, said carriers connected by said pantograph means whereby rectilinear movement of one carrier is duplicated by the other but on a different scale, a bracket adapted to be hingedly mounted at one end and at its other end receiving and supporting said tool carrier, said bracket hinged intermediate its ends, and said bracket having a rotative connection with said tool carrier whereby not to interfere with rectilinear movement of the tool carrier with said pantograph means.

13. In a wheel truing attachment for a grinding machine, a wheel dressing tool, a stylus, a pantograph means, a pair of shafts mounted by said pantograph means in such relation that rectilinear movements of one are imparted to the other but on a different scale, means mounting said tool on one of said shafts and said stylus on the other, and means for accurately locating said tool and stylus relative to the axial center lines of their respective shafts whereby to permit of the use of interchangeable tools and styli of circular and non-circular form.

14. The attachment as in claim 13 wherein said shafts are mounted for rotative movement, and means connecting said shafts whereby rotative movement of one is duplicated by the other.

15. In a grinding machine, a pantograph means, a wheel dressing tool, a stylus and a template to be traced by said stylus, a pair of rotative shafts mounted by said pantograph means in such relation that rectilinear movements of one are imparted to the other but on a different scale, a tool holder supporting said tool, and means mounting said holder on one of said shafts for adjustment radially thereof for locating the tool relative to the axial center line of said shaft, said means including an opening through the shaft, said holder extending into said opening and having a flat side therein, a locking pin extending into said shaft at an angle to said holder and having a flat side in opposing relation to the flat side of the latter, and means for forcing said locking pin into position with its flat side pressed tight against the flat side of the holder and securing the locking pin in said position.

16. In a grinding machine, a pantograph means, a wheel dressing tool, a stylus and a template to be traced by said stylus, a pair of rotative shafts mounted by said pantograph means in such relation that rectilinear movements of one are imparted to the other but on a different scale, a tool holder supporting said tool, means mounting said holder on one of said shafts for adjustment radially thereof for locating the tool relative to the axial center line of said shaft, said means including an opening through the shaft, said holder extending into said opening and having a flat side therein, a locking pin extending into said shaft at an angle to said holder and having a flat side in opposing relation to the flat side of the latter, means for forcing said locking pin into position with its flat side pressed tight against the flat side of the holder and securing the locking pin in said position, a micrometer screw mounted on said shaft at one side thereof and engaging the inner end of said tool holder, and said micrometer screw adapted to be adjusted to shift the tool holder radially through the shaft on loosening of said last mentioned means.

17. In a grinding machine, a wheel head, a shaft mounted by said head for rotary movement only relative thereto, a grinding wheel on said shaft, means mounting said head and thus said wheel for vertical adjustments only, means for effecting vertical adjustments of said head and thus said wheel, a wheel dressing means mounted on said machine, said wheel dressing means including a dressing tool, a stylus of the profile of said tool and a template to be traced by said stylus, a pantograph means mounting and connecting said stylus and tool whereby rectilinear movements of the stylus against the working face of said template are duplicated by the tool but on a reduced scale, independent means mounting the stylus and tool on the pantograph means for pivotal movements about parallel axes, and means connecting the tool and stylus whereby movement of one about its axis is duplicated by the exact same movement of the other about its axis and angular orientation of the stylus normal to the working face of the template results in shifting of the tool to position the same normal to the wheel face being dressed while the wheel is maintained in a fixed plane on said shaft.

18. In a grinding machine, a wheel head, a shaft mounted by said head for rotary movement only relative thereto, a grinding wheel on said shaft, means mounting said head and thus said wheel for vertical adjustments only, means for effecting vertical adjustments of said head and thus said wheel, a wheel dressing means mounted on said head for vertical adjustment therewith, said wheel dressing means including a dressing tool, a stylus of the profile of said tool and a template to be traced by said stylus, a pantograph means mounting and connecting said stylus and tool whereby rectilinear movements of the stylus against the working face of said template are duplicated by the tool but on a reduced scale, independent means mounting the stylus and tool on the pantograph means for pivotal movements about parallel axes, and means connecting the tool and stylus whereby movement of one about its axis is duplicated by the exact same movement of the other about its axis and angular orientation of the stylus normal to the working face of the template results in shifting of the tool to position the same normal to the wheel face being dressed while the wheel is maintained in a fixed plane on said shaft.

19. In a grinding machine, a wheel head, a shaft mounted by said head for rotary movement only relative thereto, a grinding wheel on said shaft, means mounting said head and thus said wheel for vertical adjustments only, means for effecting vertical adjustments of said head and thus said wheel, a wheel dressing means mounted on said machine, said wheel dressing means including a dressing tool, a stylus of the profile of said tool and a template to be traced by said stylus, a pantograph means mounting and connecting said stylus and tool whereby rectilinear movements of the stylus against the working face of said template are duplicated by the tool but on a reduced scale, independent means mounting the stylus and tool on the pantograph means for pivotal movements about parallel axes, and a separate linkage connecting the tool and stylus whereby movement of one about its axis is duplicated by the exact same movement of the other about its axis and angular orientation of the stylus normal to the working face of the template results in shifting of the tool to position the same normal to the wheel face being dressed while the wheel is maintained in a fixed plane on said shaft.

20. In a grinding machine, a wheel head, a shaft mounted by said head for rotary movement only relative thereto, a grinding wheel on said shaft, means mounting said head and thus said wheel for vertical adjustments only, means for effecting vertical adjustments of said head and thus said wheel, a wheel dressing means mounted on said head for vertical adjustment therewith, said wheel dressing means including a dressing tool, a stylus of the profile of said tool and a template to be traced by said stylus, a pantograph means mounting and connecting said stylus and tool whereby rectilinear movements of the stylus against the working face of said template are duplicated by the tool but on a reduced scale, independent means mounting the stylus and tool on the pantograph means for pivotal movements about parallel axes, and a separate linkage connecting the tool and stylus whereby movement of one about its axis is duplicated by the exact same movement of the other about its axis and angular orientation of the stylus normal to the working face of the template results in shifting of the tool to position the same normal to the wheel face being dressed while the wheel is maintained in a fixed plane on said shaft.

FREDERICK C. VICTORY.
J. ROBERT MOORE.

REFERENCES CITED

The following references are of record in the file of this patent:

UNITED STATES PATENTS

| Number | Name | Date |
|---|---|---|
| 1,059,271 | Bucknan | Apr. 15, 1913 |
| 1,193,049 | Olson | Aug. 1, 1916 |
| 1,715,122 | De Vlieg | May 28, 1929 |
| 1,764,901 | Snarry | June 7, 1930 |
| 1,877,637 | Atkins | Sept. 13, 1932 |
| 1,960,760 | Sutton | May 29, 1934 |
| 2,030,850 | Atti | Feb. 18, 1936 |
| 2,038,455 | Studer | Apr. 21, 1936 |
| 2,274,561 | Pernack et al | Feb. 24, 1942 |
| 2,347,283 | Ross | Apr. 25, 1944 |

FOREIGN PATENTS

| Number | Country | Date |
|---|---|---|
| 611,775 | Germany | Apr. 5, 1935 |